(12) United States Patent
Bohr et al.

(10) Patent No.: US 8,401,761 B2
(45) Date of Patent: Mar. 19, 2013

(54) FUEL INDICATOR METHOD

(75) Inventors: Scott Bohr, Plymouth, MI (US); Phillip Pierron, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 873 days.

(21) Appl. No.: 12/500,270

(22) Filed: Jul. 9, 2009

(65) Prior Publication Data

US 2011/0010070 A1 Jan. 13, 2011

(51) Int. Cl.
*G06F 19/00* (2011.01)
*G01F 25/00* (2006.01)

(52) U.S. Cl. .......................... 701/102; 701/115; 73/1.37

(58) Field of Classification Search ............... 701/29, 701/31.7, 50, 51, 101–105, 112, 114, 115; 73/1.02, 1.73; 477/174, 901
See application file for complete search history.

(56) References Cited

U.S. PATENT DOCUMENTS

| | | | | |
|---|---|---|---|---|
| 1,861,018 A | * | 5/1932 | Lange | 477/173 |
| 4,253,330 A | * | 3/1981 | Kato | 73/114.52 |
| 5,072,615 A | | 12/1991 | Nawrocki | |
| 5,386,736 A | | 2/1995 | Spillman, Jr. | |
| 5,421,295 A | * | 6/1995 | Lemaire et al. | 123/179.7 |
| 5,425,344 A | * | 6/1995 | Otsuka et al. | 123/520 |
| 5,495,745 A | | 3/1996 | Hughes | |
| 6,453,881 B1 | * | 9/2002 | Gras | 123/509 |
| 6,676,561 B2 | * | 1/2004 | Fritzer et al. | 477/70 |
| 6,690,475 B2 | | 2/2004 | Spillman, Jr. et al. | |
| 7,647,145 B2 | * | 1/2010 | Eickhoff et al. | 701/31.3 |
| 7,765,042 B2 | * | 7/2010 | Foerstner et al. | 701/31.7 |
| 7,788,005 B2 | * | 8/2010 | Enomoto et al. | 701/29.6 |
| 7,865,317 B2 | * | 1/2011 | Begin | 702/55 |
| 2002/0156557 A1 | * | 10/2002 | Gras | 701/29 |
| 2004/0133337 A1 | | 7/2004 | Ito et al. | |
| 2006/0155447 A1 | * | 7/2006 | Uken et al. | 701/50 |
| 2009/0005939 A1 | * | 1/2009 | Dueckinghaus et al. | 701/50 |
| 2009/0105895 A1 | * | 4/2009 | Shige | 701/22 |
| 2010/0018505 A1 | * | 1/2010 | Ma et al. | 123/508 |

* cited by examiner

*Primary Examiner* — John T. Kwon
*Assistant Examiner* — Johnny Hoang
(74) *Attorney, Agent, or Firm* — Julia Voutyras; Alleman Hall McCoy Russell & Tuttle LLP

(57) ABSTRACT

A method for operating a vehicle is provided. The method includes, in one example during a first a rate of change of an inclination of the vehicle, adjusting a fuel level indication based on the inclination and a level of fuel within the fuel tank; and during a second rate of change of the inclination different from the first rate of change, adjusting the fuel level indication based on actual fuel consumption of the engine. In this way, it is possible to provide an accurate fuel level indication based on the inclination when the inclination is not changing too quickly. However, when inclination is changing quickly and may give degraded level readings, it is still possible to provide an accurate fuel level by transiently estimating fuel usage and using, for example, a previous fuel level reading from when the inclination was not changing too quickly.

20 Claims, 3 Drawing Sheets

FUEL INDICATOR METHOD

BACKGROUND AND SUMMARY

Accurately determining the amount of fuel contained within the fuel tank may assist driver when operating a vehicle, allowing a driver to determine when and where the vehicle should be refueled before all of the fuel resources within the vehicle are exhausted. However, due to variable road conditions, such as uneven or bumpy roads, aftermarket modifications (e.g. adjustments in the vehicle's suspension and tire size), etc., fuel measurements may be inaccurate.

Fuel level sensors, such as floating sensors, have been used to determine the amount of fuel contained with a fuel tank. In U.S. Pat. No. 5,072,615 an inclinometer is used in conjunction with a fuel level sensor to determine the amount of fuel contained within the fuel tank. However, it may be difficult to determine the amount of fuel contained within the fuel tank when the time rate of change of the vehicle's inclination is rapidly changing. Therefore, when the vehicle is traveling along an uneven road surface, the displaced fuel within the fuel tank may adversely affect fuel quantity measurements, leading to inaccurate measurements. Consequently a driver may not be able rely on the fuel indicator, during various operating conditions. Additionally, vehicle owners may make aftermarket modifications to their vehicle, such as tire size alteration, suspension modifications, etc., leading to additional inaccuracies in the measurement of the fuel quantity.

A method for operating a vehicle including an internal combustion engine is provided. The method includes during a first a rate of change of an inclination of the vehicle, adjusting a fuel level indication based on the inclination and a level of fuel within the fuel tank; and during a second rate of change of the inclination different from the first rate of change, adjusting the fuel level indication based on actual fuel consumption of the engine.

In this way, it is possible to provide an accurate fuel level indication based on the inclination when the inclination is not changing too quickly. However, when inclination is changing quickly and may give degraded level readings, it is still possible to provide an accurate fuel level by transiently estimating fuel usage and using, for example, a previous fuel level reading from when the inclination was not changing too quickly.

In another example, a vehicle is provided, comprising: an internal combustion engine; a fuel delivery system coupled to the internal combustion engine, the fuel delivery system including a fuel tank having an in-tank fuel level sensor; a fuel indicator; two or more vehicle inclination sensors, the vehicle inclination sensors configured to determine an inclination between a bias plane and a reference plane and a direction of the inclination; and a control system including memory executable via a processor to operate the fuel indicator in an incline mode where the fuel indicator is adjusted based on the inclination, the direction of the inclination, and a level of fuel within the fuel tank, and operate the fuel indicator in a fuel consumption mode in which the fuel indicator is adjusted based on a current rate of fuel consumption of the vehicle.

In this way, different modes can be used to generate a fuel level indicator to the operator and thereby provide accurate readings under a variety of conditions.

It should be understood that the background and summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
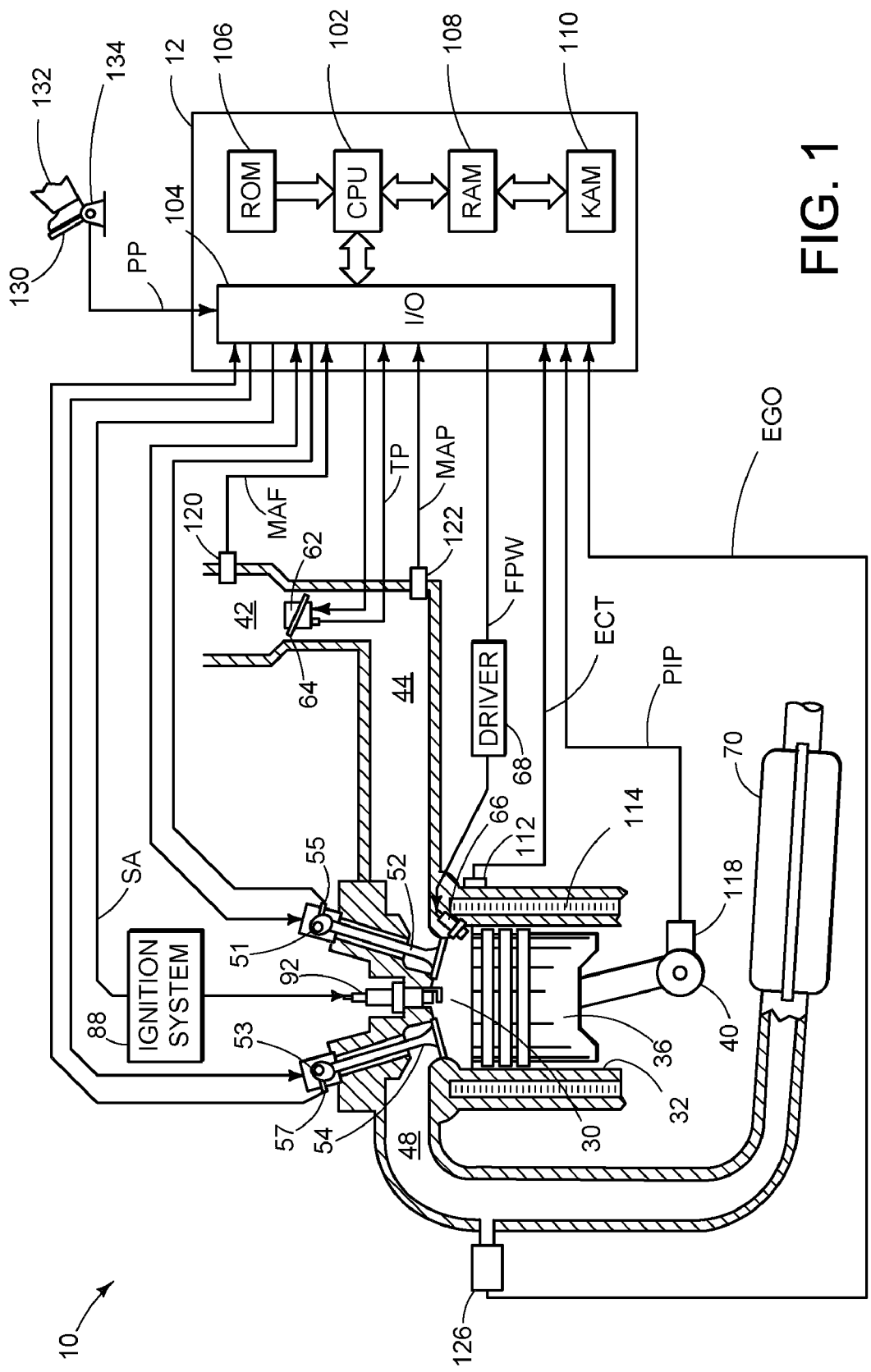
FIG. 1 is a schematic diagram of an engine system.
Figure 2:
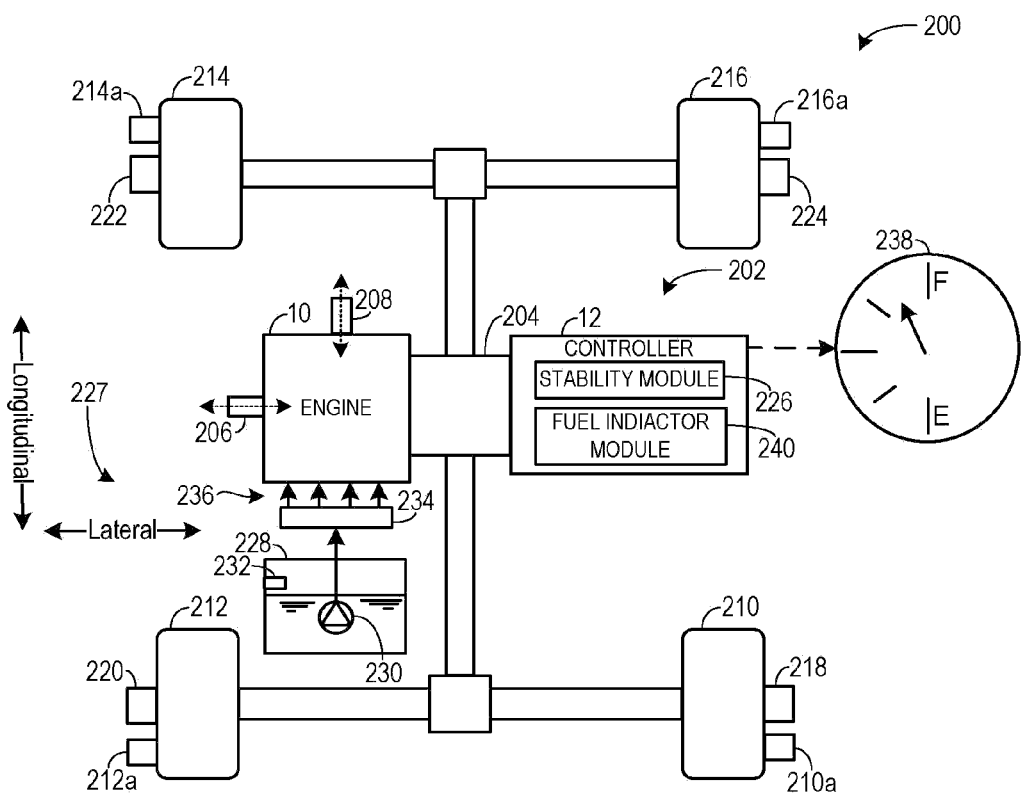
FIG. 2 illustrates a schematic depiction of a vehicle including the engine depicted in FIG. 1.
Figure 3A:
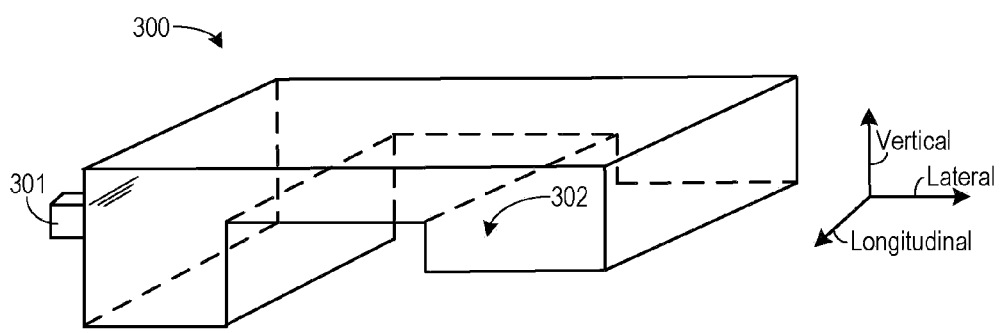
FIGS. 3A-3B illustrates an asymmetric "saddle" type fuel tank.
Figure 3B:
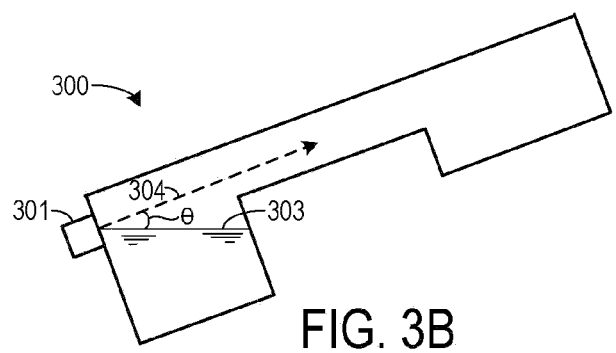

FIG. 1 shows an example engine that may be coupled in a vehicle system as shown in FIG. 2, the vehicle having an asymmetrically shaped fuel tank as illustrated in FIGS. 3A and 3B. A method is described in FIG. 4 to provide an accurate fuel level reading that takes into account angling of the vehicle about various axes of rotation (roll, pitch, etc.), as well as the rate of change of such angling. Specifically, in one example, a method for operating the vehicle with a fuel delivery system including a fuel tank and an in-tank fuel level sensor disposed within, and two or more vehicle inclination sensors is provided. The method may include adjusting a displayed fuel level based on an inclination of the vehicle (in one or more planes or about one or more axes) and a level of the fuel within the fuel tank while the rate of change of the inclination is below a threshold value. The method may further include adjusting the displayed fuel level based on the rate of fuel consumption of the internal combustion engine (and a previously determined fuel level) while the rate of change of the inclination is above the threshold value. In this way, the accuracy of the fuel indicator may be increased while the vehicle is not on a level road surface and it is possible to provide the driver with a more accurate fuel level display indication. Further, the accuracy of the fuel level indication may be increased while the vehicle is traveling down a rough road, such as a road where the gradient is rapidly changing, via transient estimation of fuel usage. Moreover, a controller may utilize signals from two or more accelerometers to calculate the inclination of the vehicle. Additionally, the signals from the accelerometers may also provide data to a stability control system {e.g. roll stability control (RSC), electronic stability control (ESC)}, configured to decrease the number of slides, skids, rolls, etc., experienced by the vehicle. Therefore, common sensor data from the accelerometers may be used to adjust the fuel indicator and the vehicle's stability control system.

Referring now to FIG. 1, a schematic diagram showing one cylinder of multi-cylinder engine 10 is described, where the engine may be included in a propulsion system of an automobile as shown in FIG. 1. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. In this example VCT is utilized. However, in other examples, alternate valve actuation systems may be used, such as electronic valve actuation (EVA) may be utilized. The position of intake valve 52 and exhaust valve 54 may be determined by position sensors 55 and 57, respectively.

Fuel injector 66 is shown arranged in combustion chamber 30 in a configuration that provides what is known as direct injection of fuel into combustion chamber 30. Fuel injector 66 may inject fuel in proportion to the pulse width of signal FPW received from controller 12 via electronic driver 68. Fuel may be delivered to fuel injector 66 via a fuel delivery system, including a fuel tank 228, a fuel pump 230, and a fuel rail 234, schematically illustrated in FIG. 2, discussed in greater detail herein. In some embodiments, combustion chamber 30 may alternatively or additionally include a fuel injector coupled directly to intake manifold 44 for injecting fuel directly therein, in a manner known as port injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Controller 12 may also be coupled to a fuel indicator, discussed in more detail with regard to FIG. 2.

As described above, FIG. 1 shows only one cylinder of a multi-cylinder engine, and that each cylinder may similarly include its own set of intake/exhaust valves, fuel injector, spark plug, etc.

FIG. 2 shows a schematic depiction of a vehicle 200 including engine 10. The vehicle may further include a control system 202 having various sensors, actuators, and controller 12. While FIG. 2 shows a single controller 12, a plurality of controllers may also be used. Engine 10 may be operably coupled to transmission 204. In one example, the transmission may have a plurality of selectable gears, allowing the power generated by the engine to be transferred to the wheels, such as an automatic or manual transmission. In another example, the transmission may be a Continuously Variable Transmission (CVT), capable of changing steplessly through an infinite number of gear ratios.

As depicted, a lateral acceleration sensor and a longitudinal acceleration sensor, 206 and 208 respectively, may be coupled to engine 10. However, it will be appreciated that the acceleration sensors may be coupled to another suitable location within the vehicle such as to the vehicles frame, fuel tank, etc. The lateral acceleration sensor may be configured to measure the lateral acceleration of the vehicle. Likewise, the longitudinal acceleration sensor may be configured to measure the longitudinal acceleration of the vehicle. Additional or alternate acceleration sensors may be coupled to various locations within the vehicle configured to measure a variety of acceleration components of the vehicle. It will be appreciated that controller 12 may utilize signals from the acceleration sensors, 206 and 208, to determine the attitude of the vehicle. The vehicle attitude may include a spatial position of the vehicle relative to three perpendicular axes (e.g. the pitch, roll, and yaw). In alternate examples, other suitable inclination sensors may be used to determine the attitude of the vehicle, such as a plurality of laser height sensor or a plurality of wheel displacement sensors.

Transmission 204 may be operably coupled to two or four wheels of the vehicle, (210, 212, 214, and/or 216). Wheel speed sensors 210a, 212a, 214a, and 216a, may be coupled to each of the vehicle's wheels 210, 212, 214, and 216, respectively. The wheel speed sensors are configured to measure the rotational speed of each individual wheel and may be coupled to controller 12.

Wheel brake mechanisms 218, 220, 222, and 224 are coupled to each wheel, 210, 212, 214, and 216, respectively. The wheel brake mechanisms may be actuated via electronic signals from controller 12. In this example, the wheel brake mechanisms include actuators (not shown), pads (not shown), rotors (not shown), etc. In other examples, alternate suitable wheel braking mechanisms may be utilized.

An electronic stability control (ESC) system may be included in control system 202. Various components may be associated with the ESC system. The components may include, but are not limited to, controller 12, stability module 226, acceleration sensors (206, 208), Hall effect sensor 118, the throttle position sensor, and various other components. The stability module may be configured to determine the vehicles course of direction as well as the vehicle's intended course of direction and adjust the vehicle accordingly so as to decrease the number of skids, slides, etc. In particular, the stability module may measure various vehicle operating conditions and determine if there is a disparity between the course of direction of the vehicle and the intended course of direction of the vehicle. In response to a disparity between the intended course of direction and actual course of direction, stability module 226 may actuate various mechanisms in the vehicle, allowing the vehicle to maintain its intended course. The mechanisms may include brake actuators of an associated braking system, the throttle, as well as the fuel delivery system, and combinations thereof. In this way, the stability of the vehicle may be increased.

In one specific example, the actual vehicle motion may be measured via a lateral acceleration, yaw, and/or wheel speed measurement. The intended course may be measured by a steering angle sensor. Further, the ESC system may take actions to correct under-steer or over-steer, such as actuating at least one braking mechanism, adjusting the throttle, etc.

Alternatively, even when the vehicle is following a desired course, the ESC system may take corrective action to increase the vehicle's roll stability. For example, a roll stability control (RSC) system may determine if one or more wheels of the vehicle may lose contact with the road due to an increase in lateral acceleration. If so, the RSC system may brake one or more wheels and/or decrease the power produced by the engine or delivered to the wheels. The RSC system may include stability module 226, wheel brake mechanisms (218, 220, 222, and 224), engine 10, and lateral acceleration sensor 206.

Vehicle 200 may further include a fuel delivery system 227 configured to deliver fuel to engine 10. The fuel delivery system may include a fuel tank 228, an in-tank fuel pump 230, and an in-tank fuel level sensor 232. The in-tank fuel sensor may be a suitable sensor, such as a float sensor, configured to measure a level of the fuel within the fuel tank. The float sensor may include a float, arm, and a resistance card, in some examples. It will be appreciated that the level of the fuel tank may refer to a position of the air-to-fuel interface along an axis aligned with the fuel tank. In this example, the level of the fuel within the fuel tank is measured along a side of the fuel tank. However, in other examples the level of the fuel may be measured along another suitable axis. The in-tank fuel pump 230 may be coupled to a fuel rail 234, which is turn is coupled to a plurality of fuel injectors 236 providing either port fuel injection, direct fuel injection, or a combination thereof to engine 10, as previously discussed. Controller 12 may be electronically coupled to a fuel indicator 238. The fuel indicator may display the amount of fuel contained within the fuel tank. Although a needle type gauge is depicted, other suitable fuel indicators may be used such as a digital display, in other examples. Furthermore, it will be appreciated that the fuel delivery system is exemplary in nature and additional components may be included in the fuel delivery system such as a high pressure pump, a fuel filter, a return-less fuel circuit, etc.

An exemplary asymmetric "saddle" type fuel tank 300 is depicted in FIG. 3A. Fuel tank 300 may be similar to fuel tank 228, in some examples. Under certain operating conditions, such as when the vehicle is on an incline, fuel may travel to a portion of the fuel tank away from the in-tank fuel sensor 301. In particular, fuel may travel over the saddle into a separate portion 302 of the fuel tank away from the in-tank fuel sensor when the inclination of the fuel tank exceeds a threshold value. Therefore, in some examples, when an inclination of the fuel tank (e.g. pitch and/or roll) exceeds the threshold value, the amount of fuel which has travelled into the separate portion of the fuel tank may be calculated and stored for use in subsequent fuel quantity calculations. In this way, the fuel contained within portions of the fuel tank which cannot be measured by the in-tank fuel level sensor may be calculated, increasing the accuracy of subsequent fuel quantity calculations. It will be appreciated that the fuel tank depicted in FIG. 3A is exemplary in nature and that other fuel tanks having alternate geometries and/or sizes may be utilized, in other examples.

Returning to FIG. 2, controller 12 may be configured to determine an inclination between a bias plane and a reference plane, facilitating determination of the amount of fuel contained within the fuel tank. In some examples, the reference plane may be substantially perpendicular to the direction of a gravitational vector of the earth. Alternatively, the reference plane may be substantially parallel to a surface (e.g. air-to-fuel interface) of the fuel within the fuel tank. Furthermore, the bias plane may be substantially parallel to a surface of the fuel tank, the vehicle frame, etc. Specifically, in some examples, the bias plane may be substantially parallel to a top surface of the fuel tank. However, in other examples, the bias plane may have an alternate orientation. It will be appreciated that the accelerometers, 206 and 208, may be used to determine the inclination between the bias plane and the reference plane and a direction of the inclination. In this way the accelerometers may be utilized to determine both the inclination of the vehicle for use in measuring fuel level, as well as the stability of the vehicle via the ESC and/or RSC system, increasing the efficiency of the vehicle.

FIG. 3B illustrates a fuel tank tilted side to side. The inclination $\theta$ between the reference plane 303 (i.e. surface of the fuel) and the bias plane 304 is depicted. However, it will be appreciated that alternate inclinations may be determined, in other examples. Furthermore, it will be appreciated under some operating conditions the bias plane and the reference plane may be parallel, such as when the vehicle is on a flat road. Moreover, in some examples, the inclination between the vehicle's frame and the reference plane may be determined. Therefore, during certain operating conditions, the inclination between the fuel tank and the reference plane may not be equivalent to the inclination between the vehicle's frame and the reference plane, due to the vehicle's suspension. Thus, the inclination between the fuel tank and the reference plane may be determined based on the inclination between the vehicle's frame and the reference plane as well as the loaded and/or unloaded weight of the vehicle.

Returning to FIG. 2, controller 12 may include a fuel indicator module 240 configured to operate the fuel indicator in at least three modes. The modes may include an "incline" mode, a "planar" mode, and a "fuel consumption" mode.

Figure 4:
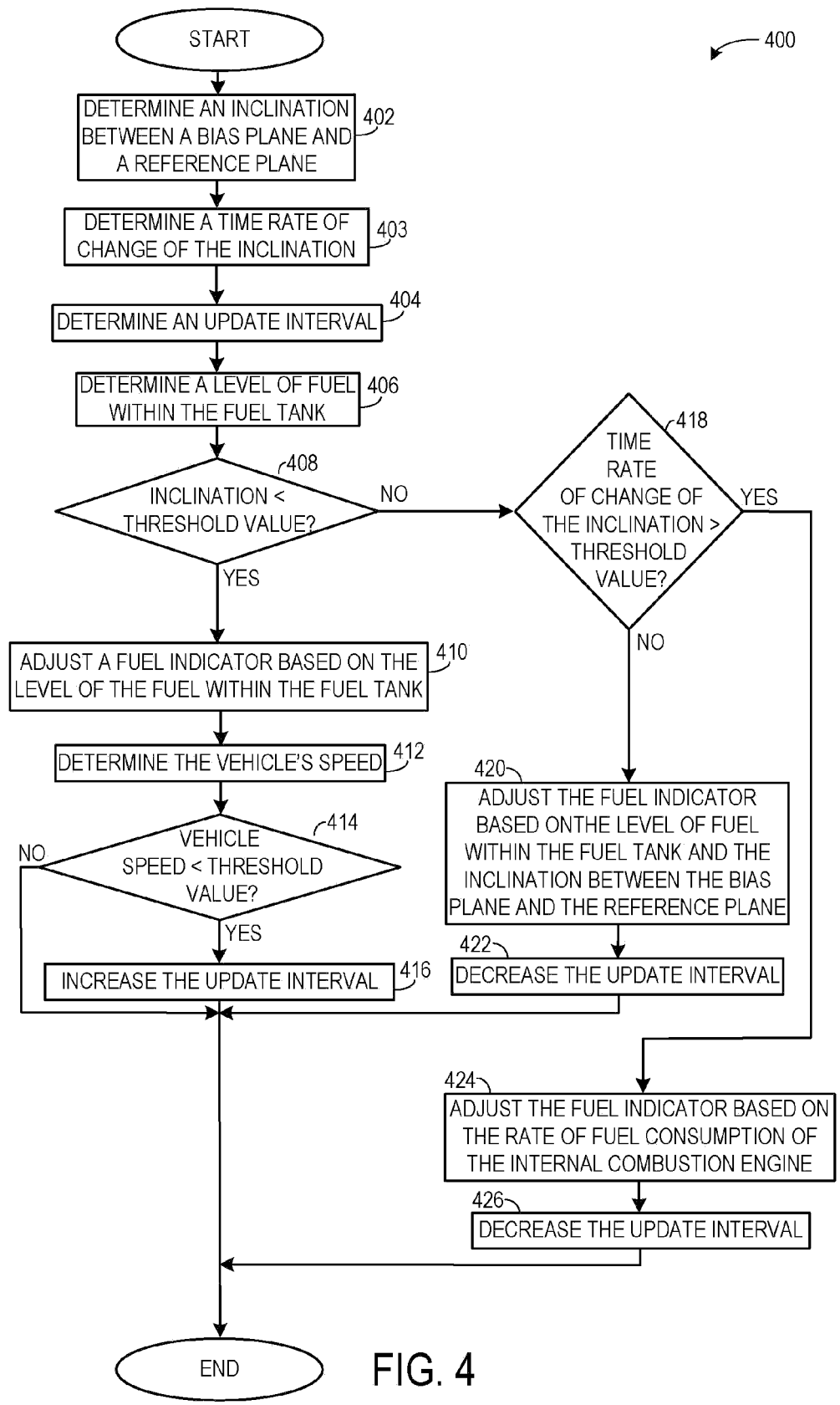
FIG. 4 illustrates a method that may be used to adjust a fuel indicator within a vehicle.

As further elaborated in FIG. 4, in the "incline" mode the fuel indicator is adjusted based on the inclination between a bias plane and a reference plane and the level of the fuel within the fuel tank, as well as based on a direction of an axis about which the bias plane is inclined. The controller may utilize signals from the in-tank fuel sensor 232 and the accelerometers, 206 and 208 respectively, to determine the amount of fuel within the fuel tank. For example, the controller may use the signal from the in-tank fuel sensor to determine a base fuel quantity and modify the base fuel quantity based on the inclination between the bias plane and the reference plane. However, in other examples, alternate techniques and sensors may be used to determine the amount of fuel contained within the fuel tank in the "incline" mode. It will be appreciated that the geometry of the fuel tank may be used to determine the amount of fuel contained within the fuel tank. The fuel indicator may be adjusted in the "incline" mode when the inclination between the bias plane and the reference plane is above a threshold value, in some examples. In this way, the accuracy of the fuel indicator may be increased while the vehicle is traveling or stopped on an uneven surface. Further in some examples, the fuel indicator may be adjusted in the "incline" mode when the rate of change (e.g., time rate of change) of the inclination is below a threshold value, decreasing and in some cases avoiding inaccurate measurements when the gradient, slope, etc., of the road is rapidly changing, such as on a primitive and unmaintained road surfaces.

A plurality of look-up tables, drawing a correlation between a quantity of fuel contained within the fuel tank and the vehicle's inclination, may be used in the "incline" mode. In some examples, a first set of look-up table may be generated for the pitch of the fuel tank (i.e. front to back inclinations) and a second set of look-up tables may be generated for the roll of the fuel tank (i.e. side to side inclinations). Thus in some examples, the inclination between the bias plane and the reference plane may be separated into a longitudinal and a lateral components. Subsequently the longitudinal and lateral components may be used as inputs into the look-up tables to determine an amount of fuel contained within a fuel tank. However, it will be appreciated that in other examples, one or more functions may be used to determine the amount of fuel contained within the fuel tank while the vehicle is on an incline. Further, as noted above, the fuel level may be determined via an alternative approach when the rate of change of inclination is above a threshold value. In some example, the alternative approach is utilized when a particular component, such as the rate of change of lateral inclination is above a threshold, irrespective of rate of change of longitudinal inclination, or vice versa.

In the "planar" mode the fuel indicator is adjusted based on a level of the fuel contained within the fuel tank, independent of inclination between the bias plane and the reference plane and the fuel consumption within the vehicle. In some examples, the controller may utilize a signal from the in-tank fuel sensor 232 to determine the amount of fuel within the fuel tank. However, in other examples, alternate sensors may be utilized to determine the amount of fuel contained within the fuel tank. Further, in some examples, the fuel indicator may be adjusted in the planar mode while the inclination between the bias plane and the reference plane is below a threshold value, which may be substantially 0.

In the "fuel consumption" mode the fuel indicator may be adjusted based on the current rate of fuel consumption of the internal combustion engine and based on previous determinations of the fuel level. For example, a preceding fuel quantity, which may be determined in either the "incline" or "planar" modes, may be modified based on the pulse width and duration of a plurality of fuel injection events delivered to the engine from at least one fuel injector during the fuel consumption mode. The fuel consumption mode may be implemented while the time rate of change of the inclination between the bias plane and the reference plane is above a threshold value, when the vehicle's speed is above a threshold value, and/or when a time rate of change of the inclination is above a threshold value, in some examples. In this way, the accuracy of the fuel indicator may be increased when the vehicle traveling along an uneven road surface or when the vehicle is stopped and idling on an incline.

The controller may update the fuel indicator at an update interval, which may be periodic. The update interval may be adjusted based on the operating conditions of the vehicle, such as the inclination between the bias plane and the reference plane, the time rate of change of the inclination, the longitudinal and/or lateral acceleration of the vehicle, the vehicle's speed, the direction of the inclination, etc., in some examples. In particular, the update interval may be increased when the vehicle speed is below a threshold value, in some examples. Thus, superfluous fuel indicator updates may be reduced, facilitating efficient management of computing resources within the vehicle. Furthermore, the update interval may be decreased when the inclination between the bias plane and the reference plane is above a threshold value and/or the time rate of change of the inclination above a threshold value. In this way, the accuracy of the fuel indicator may be increased when rapidly changing road conditions may adversely affect the fuel indicator.

FIG. 4 illustrate a method 400 which may be used to accurately determine the amount of fuel contained within a fuel tank during a variety of operating conditions, such as when the vehicle is on an incline, while the vehicle is traveling on an uneven road surface, etc. First, at 402, an inclination between a bias plane and a reference plane is determined. In some examples, the reference plane may be substantially parallel to the surface of the fuel within the fuel tank and the bias plane may be parallel to a surface of the fuel tank. In other examples, the reference plane may be substantially perpendicular to the direction of a gravitational vector of the earth and the bias plane may be parallel to a surface of the vehicle's frame, body, etc. Additionally, the direction of the inclination between the reference plane and the bias plane may be determined, in some examples. The direction of the inclination may include scalar components in the longitudinal and lateral directions.

At 403, a time rate of change of the inclination may be determined. In some examples, the time rate of change for different components of the inclination may be determined. The components may include a lateral (i.e. side-side) component and a longitudinal (i.e. front to back) component.

Next, at 404, an update interval for the fuel indicator is determined. The update interval may be the duration between update signals which are sent to the fuel indicator. Next, at 406, a level of fuel within the fuel tank is determined. It will be appreciated that in some examples, the level of fuel within the fuel tank may be determined utilizing an in-tank fuel level sensor (e.g. a float sensor)

Next, at 408, it is determined if the inclination between the bias plane and the reference plane is below a threshold value. At least one of the following parameters may be taken into account when determining the threshold value: the geometry of the fuel tank, the configuration of the fuel delivery system (e.g. fuel rail pressure, pump efficiency, etc.), the engine's demand for fuel, and the precision of the in-tank fuel sensor. In other examples, it may be determined if the inclination has exceeded a threshold value for a predetermined duration of time or if the inclination of the vehicle has remained substantially constant for a predetermined duration of time.

If the inclination between the bias plane and the reference plane is below the first threshold value (YES at 408), the method proceeds to 410 where the fuel indicator is adjusted based on the level of the fuel within the fuel tank and independent of the inclination between the bias plane and the reference plane and the rate of fuel consumption within the vehicle. Again, the inclination in a particular direction, or about a particular axis may be used, such as whether the inclination in the longitudinal direction is above the threshold, or alternatively whether the inclination in the lateral direction is above the threshold, or still further whether a combination of the inclination in both the lateral and longitudinal directions is above a threshold.

Next the method proceeds to 412, where the speed of the vehicle is determined. The speed of the vehicle may be determined via a suitable sensor such as a wheel speed sensor. Next the method advances to 414, where it is determined if the vehicle speed is below a threshold value. In some examples the threshold value may be substantially 0. However, in other examples, another suitable value may be used.

If the speed vehicle is below a threshold value (YES at 414), the method proceeds to 416, where the update interval is increased. In this way, superfluous fuel indicator updates may be reduced, decreasing the amount of required processing power within the vehicle. However, if the speed of the vehicle is not below a threshold value (NO at 414), the method ends.

On the other hand, if the inclination between the bias plane and the reference plane is above a threshold value (NO at 408), the method advances to 418, where it is determined if the time rate of change of the inclination is above a threshold value. The threshold value may be calculated utilizing at least one of the following parameters: the precision of the fuel indicator, the precision of the fuel indicator, the viscosity of the fuel, and the geometry of the fuel tank. In some examples, the threshold value of the time rate of change of the inclination may be adjusted based on the direction of the inclination. For example, a first threshold value corresponding to the magnitude of the lateral component of the time rate of change of the inclination may be averaged with a second threshold value corresponding to the magnitude of the longitudinal component of the time rage of change of the inclination.

If the time rate of change of the inclination is below the threshold value (NO at 418), the method advances to 420 where the fuel indicator is adjusted based on the level of fuel within the fuel tank and the inclination between the bias plane and the reference plane. In some examples, the level of fuel within the fuel tank may be used to determine a base fuel quantity value and the inclination may be used to determine a correction factor which is applied to the base value. Furthermore, the magnitude of the correction factor applied to the base value may be adjusted based on the direction of the inclination. For example, the correction factor may be increased when the lateral component of the inclination is larger than the longitudinal component the inclination or visa-versa, when an asymmetric (e.g. "saddle" type) fuel tank is used. However, in other examples, alternate techniques may be utilized to determine the amount of fuel contained within the fuel tank while the inclination between the bias plane and the reference plane is above a threshold value and the time rate of change of the inclination is below a threshold value. Next at 422, the update interval may be decreased in some examples. However, in other examples, the update interval may be left unchanged or may be increased. After 422 the method ends.

If the time rate of change of the inclination is above a threshold value (YES at 418), the method proceeds to 424, where the fuel indicator is adjusted based on the rate of fuel consumption of the internal combustion engine and independent of inclination between the bias plane and the reference plane and the level of fuel within the fuel tank. For example, in the context of a hybrid vehicle in which the vehicle operates and experience various inclinations, etc., even while the engine is shut-down, the fuel level can be held at a constant value independent of the inclination and variation in inclination, since based on the engine operation (or here, lack thereof), it is known that the amount of fuel onboard the vehicle is not changing. Thus, in one example, adjusting the fuel indicator based on the rate of fuel consumption within the vehicle (which may be zero during engine shut-down vehicle operation of a hybrid vehicle), can provide improved readings.

Adjusting the fuel indicator based on the rate of fuel consumption within the vehicle may also include modifying a preceding fuel quantity based on the pulse width and duration of a plurality of fuel injection events delivered to the engine at least one fuel injector. The preceding fuel quantity may be determined based on the level of fuel within the fuel tank and/or the inclination between the bias plane and the reference plane. Next the method proceeds to 426 where the update interval is decreased. After 426 the method ends.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The above technology can also be applied to all types of Hybrid Electric Vehicles (HEV's). The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle including an engine, comprising:
    during a first rate of change of an inclination of the vehicle, adjusting a displayed fuel level indication based on the inclination and a level of fuel within a fuel tank; and
    during a second rate of change of the inclination different from the first rate of change, adjusting the displayed fuel level indication based on actual fuel consumption of the engine.

2. The method of claim 1, wherein the fuel level indication is adjusted based on the inclination and the level of fuel within the fuel tank while the first rate of change of the inclination of the vehicle is below a threshold value, and the fuel level indication is adjusted based on actual fuel consumption of the engine while the second rate of change of the inclination is above the threshold value.

3. The method of claim 2, wherein the adjustment based on the fuel consumption includes modifying a previous fuel level, the previous fuel level measured while the rate of change was less than the threshold value, the modification based on a pulse width and duration of a plurality of fuel injection events delivered to the engine via at least one fuel injector while the rate of change is above the threshold.

4. The method of claim 1, further comprising while the inclination is below a first threshold value, adjusting the fuel level indication based on the level of the fuel within the fuel tank.

5. The method of claim 1, wherein the fuel level indication is adjusted at an update interval.

6. The method of claim 5, further comprising increasing the update interval when vehicle speed is below a threshold speed value.

7. The method of claim 5, further comprising adjusting the update interval based on the rate of change of the inclination.

8. The method of claim 7, further comprising increasing the update interval when the rate of change of the inclination is below a second threshold value.

9. The method of claim 2, further comprising adjusting the fuel level indication independent of the inclination while the rate of change of the inclination is above the threshold value.

10. The method of claim 2, further comprising adjusting the threshold value of the rate of change of the inclination based on a direction of the inclination, the vehicle having an asymmetrically shaped fuel tank.

11. A vehicle comprising:
    an internal combustion engine;
    a fuel delivery system coupled to the internal combustion engine, the fuel delivery system including a fuel tank having an in-tank fuel level sensor;
    a fuel indicator that displays an amount of fuel contained within the fuel tank;
    two or more vehicle inclination sensors, the vehicle inclination sensors configured to determine an inclination between a bias plane and a reference plane and a direction of the inclination; and
    a control system including memory executable via a processor to:
        operate the fuel indicator in an incline mode where the fuel indicator is adjusted based on the inclination, the direction of the inclination, and a level of fuel within the fuel tank; and
        operate the fuel indicator in a fuel consumption mode in which the fuel indicator is adjusted based on a current rate of fuel consumption of the vehicle.

12. The system of claim 11, wherein the fuel indicator is operated in the incline mode while a time rate of change of the inclination between the bias plane and the reference plane is below a threshold value and the fuel indicator is operated in the fuel consumption mode while the time rate of change of the inclination is above the threshold value.

13. The system of claim 11, wherein the bias plane is aligned with a surface of the fuel tank.

14. The system of claim 11, wherein the vehicle inclination sensors are accelerometers.

15. The system of claim 14, wherein the accelerometers are utilized in an electronic stability control system configured to actuate at least one of a vehicle braking mechanism, a throttle, and/or the fuel delivery system when the difference between a vehicle's intended course of direction and a vehicle's actual course of direction is greater than a threshold value.

16. The system of claim 11, further comprising memory executable by the processor to:
    operate the fuel indicator in a planar mode in which the fuel indicator is adjusted based on a level of the fuel contained within the fuel tank, while the inclination between the bias plane and the reference plane is below a threshold value.

17. The system of claim 11, wherein the fuel indicator is adjusted at a periodic update interval.

18. The system of claim 17, further comprising code executable to adjust the update interval based on the inclination between the bias plane and the reference plane.

19. The system of claim 18, wherein the update interval is decreased while a time rate of change of the inclination is below a threshold value.

20. A method for operating a vehicle including an internal combustion engine, a fuel delivery system coupled to the internal combustion engine, the fuel delivery system including a fuel tank and an in-tank fuel level sensor disposed within, and two or more vehicle inclination sensors, the method comprising:
    while an inclination between a bias plane and a reference plane is below a threshold value, the reference plane substantially parallel to a surface of the fuel within the fuel tank and the bias plane substantially perpendicular to a direction of a gravitational vector of the earth, adjusting a fuel indicator based on a level of the fuel within the fuel tank, the fuel indicator displaying a fuel amount;
    while the inclination between the bias plane and the reference plane is above the threshold value and a time rate of change of the inclination is below a threshold value, adjusting the fuel indicator based on the inclination between the bias plane and the reference plane and the level of the fuel within the fuel tank; and
    while the time rate of change of the inclination is above the threshold value, adjusting the fuel indicator based on a rate of fuel consumption of the internal combustion engine; and
    adjusting a fuel indicator update interval based on the time rate of change of the inclination between the reference plane and the bias plane.

* * * * *